United States Patent
Nakama et al.

(10) Patent No.: US 11,467,352 B2
(45) Date of Patent: Oct. 11, 2022

(54) FERRULE, FIBER-ATTACHED FERRULE, AND METHOD OF MANUFACTURING FIBER-ATTACHED FERRULE

(71) Applicant: FUJIKURA LTD., Tokyo (JP)

(72) Inventors: Akihiro Nakama, Chiba (JP); Hirotaka Asada, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/294,916

(22) PCT Filed: Sep. 17, 2019

(86) PCT No.: PCT/JP2019/036292
§ 371 (c)(1),
(2) Date: May 18, 2021

(87) PCT Pub. No.: WO2020/105258
PCT Pub. Date: May 28, 2020

(65) Prior Publication Data
US 2022/0003940 A1   Jan. 6, 2022

(30) Foreign Application Priority Data

Nov. 22, 2018 (JP) .............................. JP2018-219496
May 24, 2019 (JP) .............................. JP2019-097646

(51) Int. Cl.
*G02B 6/38* (2006.01)
*G02B 6/25* (2006.01)
*G02B 6/40* (2006.01)

(52) U.S. Cl.
CPC .............. *G02B 6/3853* (2013.01); *G02B 6/25* (2013.01); *G02B 6/3851* (2013.01);
(Continued)

(58) Field of Classification Search
CPC ...... G02B 6/25; G02B 6/3851; G02B 6/3853; G02B 6/3882; G02B 6/3885; G02B 6/403
See application file for complete search history.

(56) References Cited

U.S. PATENT DOCUMENTS 6,012,852 A * 1/2000 Kadar-Kallen .......... G02B 6/32
385/74
9,025,917 B2 * 5/2015 Aoki ...................... G02B 6/327
385/74
(Continued)

FOREIGN PATENT DOCUMENTS

JP   2003215388 A   7/2003
JP   2004045646 A   2/2004
(Continued)

OTHER PUBLICATIONS

International Search Report issued in corresponding International Application No. PCT/JP2019/036292, dated Nov. 5, 2019, with translation (5 pages).
(Continued)

*Primary Examiner* — Ryan A Lepisto
(74) *Attorney, Agent, or Firm* — Osha Bergman Watanabe & Burton LLP

(57) ABSTRACT

A ferrule includes: a main body configured to hold an end of a first optical fiber and an end of a second optical fiber parallel to the first optical fiber; and a lens plate including a first abutment surface configured to abut against an end face of the first optical fiber, a second abutment surface configured to abut against an end face of the second optical fiber, a first lens configured to face the end face of the first optical fiber, and a second lens configured to face the end face of the second optical fiber. The first abutment surface is inclined with respect to a plane perpendicular to a first optical axis of the first optical fiber. The second abutment surface is
(Continued)

inclined with respect to a plane perpendicular to a second optical axis of the second optical fiber.

10 Claims, 7 Drawing Sheets

(52) U.S. Cl.
CPC ......... *G02B 6/3882* (2013.01); *G02B 6/3885* (2013.01); *G02B 6/403* (2013.01)

(56) References Cited

U.S. PATENT DOCUMENTS

| | | | |
|---|---|---|---|
| 9,405,076 B2* | 8/2016 | Chen | G02B 6/32 |
| 10,222,559 B2* | 3/2019 | Nakama | G02B 6/3882 |
| 10,605,997 B2* | 3/2020 | Nakama | G02B 6/3861 |
| 10,705,299 B2* | 7/2020 | Nakama | G02B 6/3885 |
| 11,125,950 B2* | 9/2021 | Watanabe | G02B 6/3885 |
| 11,143,820 B2* | 10/2021 | Tsunoda | G02B 6/32 |
| 11,199,667 B2* | 12/2021 | Nakama | G02B 6/3861 |
| 2011/0026882 A1* | 2/2011 | Budd | G02B 6/32 |
| | | | 385/60 |

FOREIGN PATENT DOCUMENTS

| | | | | |
|---|---|---|---|---|
| JP | 2014521996 A | | 8/2014 | |
| JP | 2018092152 A | * | 6/2018 | ............ G02B 6/32 |
| JP | 2018092152 A | | 6/2018 | |

OTHER PUBLICATIONS

Written Opinion issued in corresponding International Application No. PCT/JP2019/036292, dated Nov. 5, 2019 (4 pages).

* cited by examiner

US 11,467,352 B2

FERRULE, FIBER-ATTACHED FERRULE, AND METHOD OF MANUFACTURING FIBER-ATTACHED FERRULE

TECHNICAL FIELD

The present invention relates to a ferrule, a fiber-attached ferrule, and a method of manufacturing a fiber-attached ferrule.

BACKGROUND

Technology of a so-called lensed connector for arranging ferrules each having a lens at an end face thereof such that the ferrules face each other, thereby optically connecting optical fibers held by the respective ferrules has been known. Examples of such a lensed connector include a lensed connector disclosed in Patent Document 1 which includes a ferrule that holds ends of two optical fibers.

The lensed connector described in Patent Document 1 is provided with an abutment surface for which end faces of two optical fibers abut. An optical signal that has been transmitted in the optical fiber, may back to the optical fiber by reflecting on the abutment surface. Thus, in the lensed connector described in Patent Document 1, the abutment surface is inclined with respect to a plane perpendicular to the optical axis of the optical fiber such that optical signals are reflected at a predetermined angle on the abutment surface (see FIG. 9B of Patent Document 1).

PATENT LITERATURE

Patent Document 1: JP 2018-92152 A

In a case where end faces of two optical fibers abut against the inclined abutment surface as illustrated in FIG. 9B of Patent Document 1, the position of the end face of one of the optical fibers in the optical axis direction is different from the position of the end face of the other of the optical fibers in the optical axis direction. As a result, the optical path length of the optical signal incident or emission from one of the optical fibers, from the end face of the optical fiber to the lens, is different from the optical path length of the optical signal incident or emission from the other of the optical fibers, from the end face of the optical fiber to the lens. To address the problem, a step may be provided on the abutment surface, as illustrated in FIG. 9C of Patent Document 1. This makes it possible to allow the optical signals incident or emission from both of the optical fibers to have the same optical path lengths from the end face of the optical fiber to the lens. However, this results in the problem that the ferrule becomes structurally complex.

SUMMARY

One or more embodiments of the present invention provide a simple ferrule structure for a lensed connector holding ends of two optical fibers while reducing a difference, between the two optical fibers, in optical path length from a corresponding end face of each of the optical fibers to a corresponding lens.

Some embodiments of the present invention provide a ferrule configured to hold an end of a first optical fiber and an end of a second optical fiber juxtaposed with the first optical fiber. The ferrule includes a first abutment surface against which an end face of the first optical fiber abuts, a second abutment surface against which an end face of the second optical fiber abuts, a first lens disposed corresponding to the end face of the first optical fiber, and a second lens disposed corresponding to the end face of the second optical fiber. The first abutment surface is inclined with respect to a plane perpendicular to an optical axis of the first optical fiber, the second abutment surface is inclined with respect to a plane perpendicular to an optical axis of the second optical fiber, and the first abutment surface and the second abutment surface are symmetric with respect to a symmetry plane defined as a plane with respect to which the optical axis of the first optical fiber and the optical axis of the second optical fiber are symmetric.

Other features of the present invention will be apparent from description of the specification and drawings describes below.

Some embodiments of the present invention can provide a simple ferrule structure for a lensed connector holding ends of two optical fibers while reducing a difference, between the two optical fibers, in optical path length from a corresponding end face of each of the optical fibers to a corresponding lens.

DETAILED DESCRIPTION

Figure 1A:
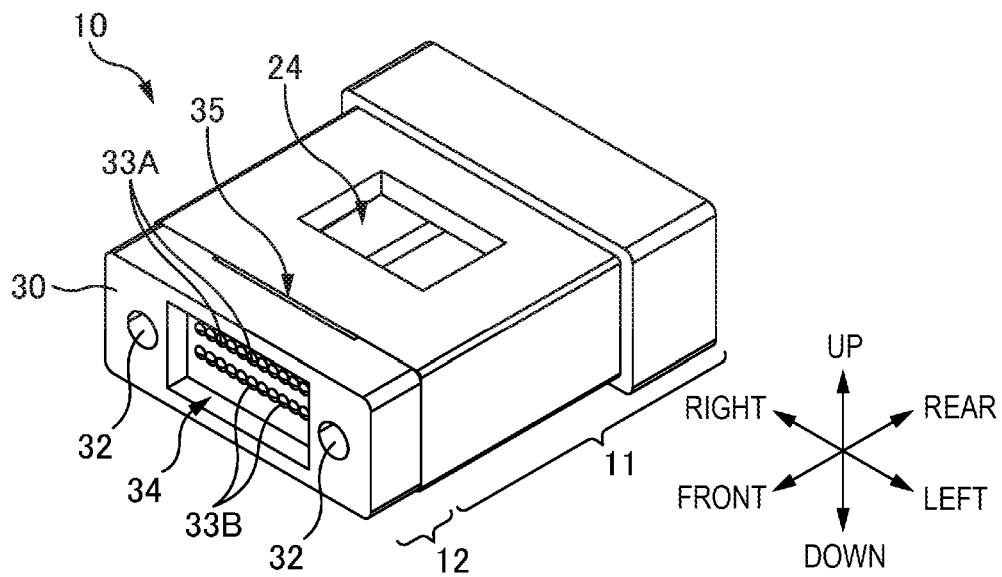
FIG. 1A is an overall perspective view of a ferrule structure 10 according to one or more embodiments.

At least the following matters will be apparent from description of the specification and drawings describes below.

There is disclosed a ferrule configured to hold an end of a first optical fiber and an end of a second optical fiber parallel to the first optical fiber, the ferrule including, a first abutment surface configured to be abutted against an end face of the first optical fiber, a second abutment surface configured to be abutted against an end face of the second optical fiber, a first lens disposed corresponding to the end face of the first optical fiber, and a second lens disposed corresponding to the end face of the second optical fiber. In the ferrule, the first abutment surface is inclined with respect to a plane perpendicular to an optical axis of the first optical fiber, the second abutment surface is inclined with respect to a plane perpendicular to an optical axis of the second optical fiber, and the first abutment surface and the second abutment surface are symmetric with respect to a symmetry plane defined as a plane with respect to which the optical axis of the first optical fiber and the optical axis of the second optical fiber are symmetric. With the ferrule, it is possible to provide a simple ferrule structure for a lensed connector holding ends of two optical fibers while reducing a difference, between the two optical fibers, in optical path length from a corresponding end face of each of the optical fibers to a corresponding lens.

A distance between the optical axis of the first optical fiber and the optical axis of the second optical fiber may be equal to a distance between a center of the first lens and a center of the second lens. This makes it possible to provide a simple ferrule structure for a lensed connector holding ends of two optical fibers while reducing a difference, between the two optical fibers, in optical path length from a corresponding end face of each of the optical fibers to a corresponding lens.

There is disclosed a fiber-attached ferrule including, a first optical fiber, a second optical fiber parallel to the first optical fiber, and a ferrule configured to hold an end of the first optical fiber and an end of the second optical fiber. In the fiber-attached ferrule, the ferrule includes a first abutment surface configured to be abutted against an end face of the first optical fiber, a second abutment surface configured to be abutted against an end face of the second optical fiber, a first lens disposed corresponding to the end face of the first optical fiber, and a second lens disposed corresponding to the end face of the second optical fiber, wherein the first abutment surface is inclined with respect to a plane perpendicular to an optical axis of the first optical fiber, wherein the second abutment surface is inclined with respect to a plane perpendicular to an optical axis of the second optical fiber, and wherein the first abutment surface and the second abutment surface are symmetric with respect to a symmetry plane defined as a plane with respect to which the optical axis of the first optical fiber and the optical axis of the second optical fiber are symmetric. With the fiber-attached ferrule, it is possible to provide a simple ferrule structure for a lensed connector holding ends of two optical fibers while reducing a difference, between the two optical fibers, in optical path length from a corresponding end face of each of the optical fibers to a corresponding lens.

A distance from the end face of the first optical fiber to the first lens may be equal to a distance from the end face of the second optical fiber to the second lens. This makes it possible to reduce the difference between the optical path length from the end face of the first optical fiber to a lens surface of the first lens, of optical signals incident or emission from the first optical fiber and the optical path length from the end face of the second optical fiber to a lens surface of the second lens, of optical signals incident or emission from the second optical fiber.

The end face of the first optical fiber may be formed inclined with respect to a plane perpendicular to the optical axis of the first optical fiber and may be in contact with the first abutment surface, and the end face of the second optical fiber may be formed inclined with respect to a plane perpendicular to the optical axis of the second optical fiber and may be in contact with the second abutment surface. This makes it possible to decrease a gap between the end face of the optical fiber and the abutment surface.

There is disclosed a method of manufacturing a fiber-attached ferrule including a first optical fiber, a second optical fiber parallel to the first optical fiber, and a ferrule configured to hold an end of the first optical fiber and an end of the second optical fiber. The method includes preparing a ferrule including a first abutment surface configured to be abutted against an end face of the first optical fiber, a second abutment surface configured to against an end face of the second optical fiber, a first lens disposed corresponding to the end face of the first optical fiber, and a second lens disposed corresponding to the end face of the second optical fiber, wherein the first abutment surface being inclined with respect to a plane perpendicular to an optical axis of the first optical fiber, wherein the second abutment surface being inclined with respect to a plane perpendicular to an optical axis of the second optical fiber, and wherein the first abutment surface and the second abutment surface being symmetric with respect to a symmetry plane defined as a plane with respect to which the optical axis of the first optical fiber and the optical axis of the second optical fiber are symmetric, butting the end face of the first optical fiber against the first abutment surface, and butting the end face of the second optical fiber against the second abutment surface. With the method of manufacturing a fiber-attached ferrule, it is possible to provide a simple ferrule structure for a lensed connector holding ends of two optical fibers while reducing a difference, between the two optical fibers, in optical path length from a corresponding end face of each of the optical fibers to a corresponding lens.

The first optical fiber may be cut to form the end face of the first optical fiber inclined with respect to a plane perpendicular to the optical axis of the first optical fiber, and the second optical fiber may be cut to form the end face of the second optical fiber inclined with respect to a plane perpendicular to the optical axis of the second optical fiber. This makes it possible to decrease a gap between the end face of the optical fiber and the abutment surface.

There is disclosed a ferrule configured to hold an end of a first optical fiber and an end of a second optical fiber parallel to the first optical fiber, the ferrule including a first abutment surface configured to be abutted against an end face of the first optical fiber, a second abutment surface configured to be abutted against an end face of the second optical fiber, a first lens disposed corresponding to the end face of the first optical fiber, and a second lens disposed corresponding to the end face of the second optical fiber. In the ferrule, the first abutment surface is inclined with respect to a plane perpendicular to an optical axis of the first optical fiber, the second abutment surface is inclined with respect to a plane perpendicular to an optical axis of the second optical fiber, and the first abutment surface and the second abutment surface are symmetrically formed. With the ferrule, it is possible to provide a simple ferrule structure for a lensed connector holding ends of two optical fibers while reducing a difference, between the two optical fibers, in optical path length from a corresponding end face of each of the optical fibers to a corresponding lens.

There is disclosed a fiber-attached ferrule, including, a first optical fiber, a second optical fiber parallel to the first optical fiber, and a ferrule configured to hold an end of the first optical fiber and an end of the second optical fiber. In the fiber-attached ferrule, the ferrule includes a first abutment surface configured to be abutted against an end face of the first optical fiber, a second abutment surface configured to be abutted against an end face of the second optical fiber, a first lens disposed corresponding to the end face of the first optical fiber, and a second lens disposed corresponding to the end face of the second optical fiber, wherein the first abutment surface is inclined with respect to a plane perpendicular to an optical axis of the first optical fiber, wherein the second abutment surface is inclined with respect to a plane perpendicular to an optical axis of the second optical fiber, and wherein the first abutment surface and the second abutment surface are symmetrically formed. With the fiber-attached ferrule, it is possible to provide a simple ferrule structure for a lensed connector holding ends of two optical fibers while reducing a difference, between the two optical fibers, in optical path length from a corresponding end face of each of the optical fibers to a corresponding lens.

There is disclosed a method of manufacturing a fiber-attached ferrule including a first optical fiber, a second optical fiber parallel to the first optical fiber, and a ferrule configured to hold an end of the first optical fiber and an end of the second optical fiber. The method includes preparing a ferrule including a first abutment surface configured to be abutted against an end face of the first optical fiber, a second abutment surface configured to be abutted against an end face of the second optical fiber, a first lens disposed corresponding to the end face of the first optical fiber, and a second lens disposed corresponding to the end face of the second optical fiber, wherein the first abutment surface being inclined with respect to a plane perpendicular to an optical axis of the first optical fiber, wherein the second abutment surface being inclined with respect to a plane perpendicular to an optical axis of the second optical fiber, and wherein the first abutment surface and the second abutment surface being symmetrically formed, butting the end face of the first optical fiber against the first abutment surface, and butting the end face of the second optical fiber against the second abutment surface. With the method of manufacturing a fiber-attached ferrule, it is possible to provide a simple ferrule structure for a lensed connector holding ends of two optical fibers while reducing a difference, between the two optical fibers, in optical path length from a corresponding end face of each of the optical fibers to a corresponding lens.

EMBODIMENTS

Overall Configuration of Ferrule Structure 10

Figure 1B:
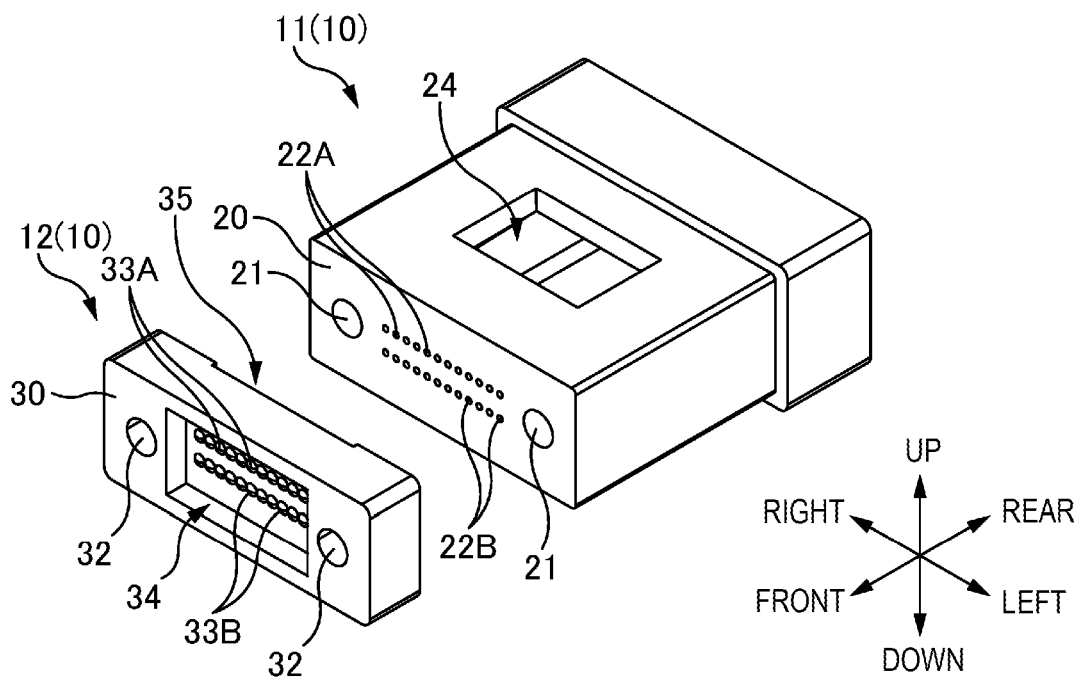
FIG. 1B is an exploded perspective view of the ferrule structure 10 according to one or more embodiments.
Figure 2A:
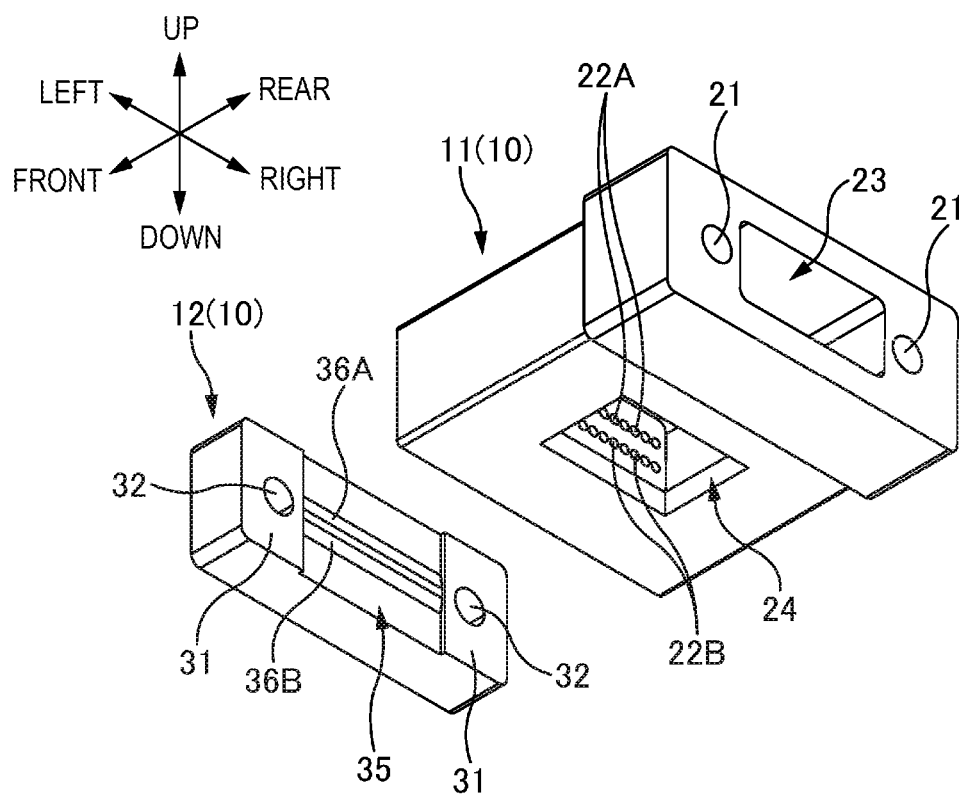
FIG. 2A is an exploded perspective view of the ferrule structure 10 according to one or more embodiments as viewed from the bottom side.
Figure 2B:
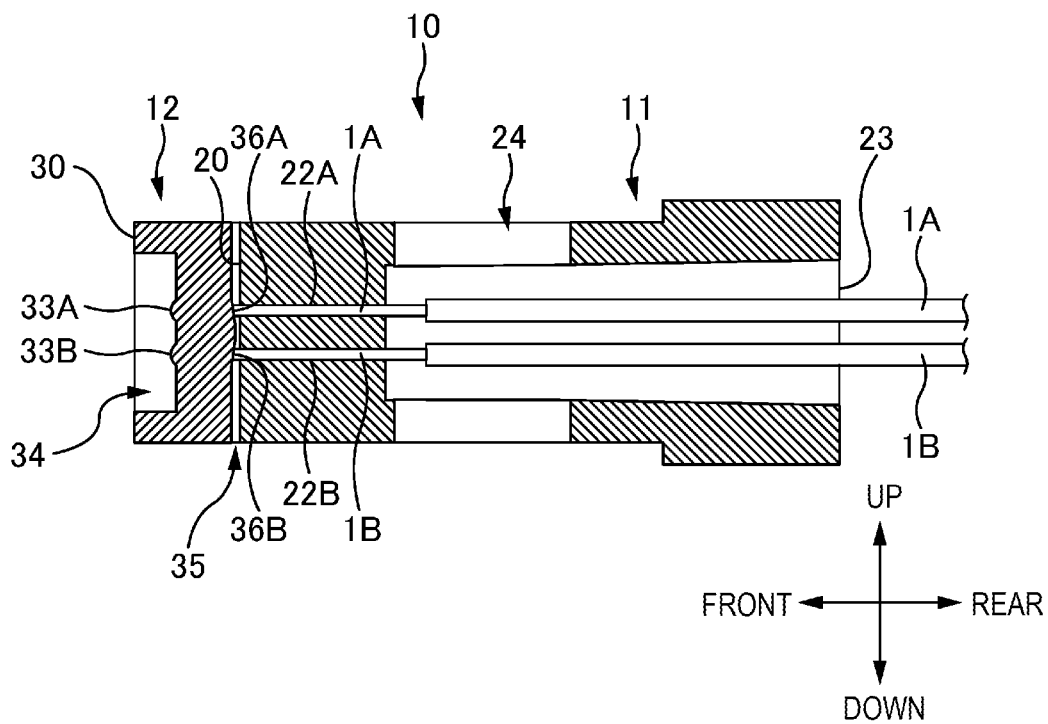
FIG. 2B is a cross-sectional view of a fiber-attached ferrule structure 10 according to one or more embodiments.

FIG. 1A is an overall perspective view of a ferrule structure 10 according to one or more embodiments. FIG. 1B is an exploded perspective view of the ferrule structure 10 according to one or more embodiments. FIG. 2A is an exploded perspective view of the ferrule structure 10 according to one or more embodiments as viewed from the bottom side. FIG. 2B is a cross-sectional view of a fiber-attached ferrule structure 10 according to one or more embodiments.

In the following description, directions are defined as indicated in the figures. Specifically, a direction of fiber holes 22 (a fiber hole 22A and fiber hole 22B) is referred to as a "front-rear direction". A side on which end faces of optical fibers 1 (an optical fiber 1A and optical fiber 1B) inserted into the fiber holes 22 are located, or a side on which a lens plate 12 is located as viewed from a ferrule main body 11 is referred to as the "front" and the opposite side thereto is referred to as the "rear". Additionally, a direction in which two main body side guide holes 21 are arranged, or a direction in which two plate side guide holes 32 are arranged is referred to as a "left-right direction", the right side as viewed from rear to front is referred to as "right", and the left side is "left". Furthermore, a direction perpendicular to the front-rear direction and the left-right direction is referred to as an "up-down direction". Note that in an optical connector having the ferrule structure 10, a side on which a key 5 (see FIG. 3B described below) is provided is referred to as "upside" and the opposite side thereto is "downside".

The ferrule structure 10 is a member holding ends of the optical fibers 1 (the optical fiber 1A and optical fiber 1B) for optically connecting the optical fibers 1 to another optical component. The ferrule structure 10 can be simply referred to as a "ferrule." The ferrule structure 10 includes the ferrule main body 11 and the lens plate 12.

The ferrule main body 11 is a member that is holding the ends of the optical fibers 1. The ferrule main body 11 includes two main body side guide holes 21, the fiber holes 22 (the fiber hole 22A and fiber hole 22B), a fiber insertion port 23, and an adhesive filled portion 24.

Note that the ferrule main body 11 has a configuration substantially the same as, for example, Mechanically Transferable (MT) optical connectors (F12 type optical connectors defined by JIS C5981). In typical MT optical connectors, an end face of a ferrule and an end face of an optical fiber are polished. However, in one or more embodiments, as described below, end faces 3 (an end face 3A and end face 3B) of the optical fibers 1 (the optical fiber 1A and optical fiber 1B) are protruded from a front end face 20 (opening surface of the fiber holes 22) of the ferrule main body 11, and the end face of the ferrule and the end faces of the optical fibers are not polished. In addition, in typical MT optical connectors, end faces of fibers are exposed at an end face of a ferrule, while, in one or more embodiments, the end faces of the optical fibers are not exposed to the outside. This is because, in the present one or more embodiments, the lens plate 12 is disposed in front of the ferrule main body 11, and the end faces 3 of the optical fibers 1 are butted against the lens plate 12.

The two main body side guide holes 21 are holes into which guide pins (not illustrated) are inserted. As described below, the main body side guide holes 21 are also used to align the ferrule main body 11 with the lens plate 12. The main body side guide holes 21 extend through the ferrule main body 11 along the front-rear direction, and the two main body side guide holes 21 are open in the front end face 20 of the ferrule main body 11. The two main body side guide holes 21 are spaced apart from each other in the left-right direction such that the plurality of fiber holes 22 (the fiber hole 22A and the fiber hole 22B) are positioned between the two main body side guide holes 21 in the left-right direction.

The fiber holes 22 are holes into which the optical fibers 1 are inserted. The fiber holes 22 are also holes used for positioning the optical fibers 1. Therefore, the fiber holes 22 are formed with high accuracy with respect to the main body side guide holes 21. The fiber holes 22 extend from the front end face 20 to the adhesive filled portion 24, and the fiber holes 22 are open in the front end face 20 of the ferrule main body 11. Bare optical fibers prepared by removing sheaths from coated optical fibers are inserted into the fiber holes 22. The fiber holes 22 are formed along the front-rear direction.

The plurality of fiber holes 22 (the fiber hole 22A and fiber hole 22B) are formed in the ferrule main body 11 according to one or more embodiments. Furthermore, in one or more embodiments, two rows of the fiber holes 22, each formed by the fiber holes 22 arranged in the left-right direction, are arranged in the up-down direction. As illustrated in FIGS. 1B to 2B, the upper row of the fiber holes 22 may be referred to as the fiber holes 22A, and the lower row of the fiber holes 22 may be referred to as the fiber holes 22B. The optical fibers 1 (the optical fibers 1A and optical fibers 1B) included in optical fiber tapes (optical fiber ribbons) are inserted into the respective fiber holes 22 (the fiber holes 22A and fiber holes 22B) of the rows of fiber holes 22 arranged in the left-right direction. In one or more embodiments, an optical fiber tape (optical fiber ribbon) including the optical fibers 1A is inserted into the fiber holes 22A, and an optical fiber tape (optical fiber ribbon) including the optical fibers 1B is inserted into the fiber holes 22B. However, the fiber hole 22A and the fiber hole 22B may not be provided as the rows of the fiber holes arranged in the left-right direction. For example, a single fiber hole 22A may be formed on the upper side and a single fiber hole 22B may be formed on the lower side. In this case, the optical fiber 1 inserted into each of the fiber hole 22A and the fiber hole 22B is a single-core optical fiber rather than an optical fiber tape (optical fiber ribbon).

The fiber insertion port 23 is an opening formed in a rear end face of the ferrule main body 11. The optical fibers 1 (the optical fiber 1A and optical fiber 1B) are inserted into the ferrule main body 11 through the fiber insertion port 23. A boot (not illustrated) may be inserted into the ferrule main body 11, and thus the fiber insertion port 23 may also be referred to as a "boot hole".

The adhesive filled portion 24 is a cavity to be filled with an adhesive. The adhesive filled portion 24 is filled with an adhesive for anchoring the optical fibers 1 to the ferrule main body 11. Once the adhesive filled portion 24 is filled with an adhesive, the adhesive is applied to the adhesive filled portion 24 and between the optical fibers 1 and the inner wall surfaces of the fiber holes 22. Once the adhesive is cured, the optical fibers 1 are fixed to the ferrule main body 11.

The lens plate 12 is an optical member provided with a plurality of lenses (an upper lens 33A and lower lens 33B). The lens plate 12 is formed of a transparent resin that transmits optical signals. The lens plate 12 is disposed in front of the ferrule main body 1 with a rear end face 31 of the lens plate 12 contacting the front end face 20 of the ferrule main body 11. The lens plate 12 includes the two plate side guide holes 32, the lens part 33 (the upper lens 33A and lower lens 33B), and abutment surfaces 36 (an upper abutment surface 36A and lower abutment surface 36B).

The two plate side guide holes 32 are holes into which guide pins (not illustrated) are inserted. Inserting the guide pins into the plate side guide holes 32 allows the ferrule structures 10 to be aligned with each other. Note that the plate side guide holes 32 are also used to align the ferrule main body 11 with the lens plate 12. Thus, the distance between the two plate side guide holes 32 is equal to the distance between the two main body side guide holes 21 of the ferrule main body 10. In other words, the distance between the central axes of the two plate side guide holes 32 is the same as the distance between the central axes of the two main body side guide holes 21 of the ferrule main body 10. The plate side guide holes 32 extend through the lens plate 12 along the front-rear direction, and the two plate side guide holes 32 are each open in the front end face 30 and the rear end face 31 of the lens plate 12.

Each of the lens part 33 (the upper lenses 33A and lower lenses 33B) is disposed corresponding to one of the end faces of the plurality of optical fibers 1 (the optical fiber 1A and optical fiber 1B), each inserted into a corresponding one of the plurality of fiber holes 22 (the fiber hole 22A and fiber hole 22B). As a result, optical signals to be incident on or exiting from the end face of the optical fibers 1 pass through the lens part 33. As described above, in one or more embodiments, the row of the fiber holes 22A arranged in the left-right direction is provided on the upper side of the ferrule main body 11, and the row of the fiber holes 22B arranged in the left-right direction is provided on the lower side of the ferrule main body 11. In addition, the two rows of lens part 33 arranged in the left-right direction are arranged in the up-down direction in the lens part 33. In other words, as a result of providing, on the upper side of the lens plate 12, the row of the upper lenses 33A arranged in the left-right direction, the row of the upper lenses 33A is disposed corresponding to the end faces of the optical fibers 1A inserted into the respective fiber holes 22A in the row of the fiber holes 22A. In addition, as a result of providing, on the lower side of the lens plate 12, the row of the lower lenses 33B arranged in the left-right direction, the row of the lower lenses 33B is disposed corresponding to the end faces of the optical fibers 1B inserted into the respective fiber holes 22B in the row of the fiber holes 22B. Therefore, the lens part 33 are formed with high accuracy with respect to the plate side guide holes 32. The lens part 33 is formed to function as a collimator lens, for example. The lens part 33 increase diameters of incident and emission optical signals to allow the optical signals to be propagated as collimated light. Thus, it is possible to achieve stable connection even if there is dust between the connectors, and thus to reduce transmission loss of the optical signal. In addition, the lens part 33 increase diameters of incident and emission optical signals to allow the optical signals to be propagated as collimated light, and thus even if there is misalignment of an optical path of an optical signal between the connectors, it is possible to reduce transmission loss of the optical signal. The lens part 33 is formed on the front end face 30 side of the lens plate 12 and is formed in the front end face of the ferrule structure 10. To prevent the lens part 33 formed as convex lenses from coming into contact with each other when the ferrule structures 10 are brought close to face each other, the lens part 33 are formed at the bottom of a recess (a lens provided portion 34) formed in the lens plate 12. Provided that the fiber hole 22A is formed as single hole on the upper side of the ferrule main body 11 and the fiber hole 22B is formed as single hole on the lower side of the ferrule main body 11, the upper lens 33A and the lower lens 33B, corresponded to the fiber hole 22A and 22B, are provided as single each other.

The abutment surface 36 is an abutment surface against which the end faces of the optical fibers 1 abut. The abutment surface 36 is formed at a bottom of an abutment surface arrangement portion 35, which is a part recessed from the rear end face 31 of the lens plate 12. Thus, once the lens plate 12 is attached to the ferrule main body 11 via the guide pins (not illustrated) (as described below), the abutment surface 36 faces the openings of the fiber holes 22 of the ferrule main body 11. Note that the width in the left-right direction of the bottom surface (the abutment surface 36) of the abutment surface arrangement portion 35 is longer than the width of the rows of the fiber holes 22 (the fiber hole 22A and the fiber hole 22B) arranged in the left-right direction (longer than the width of the optical fiber tape). As a result of forming the abutment surface arrangement portion 35, a gap is formed between the opening surface of the fiber holes 22 of the ferrule main body 11 and the abutment surface 36 of the lens plate 12. That is, as a result of forming, in the lens plate 12, the abutment surface arrangement portion 35, a gap is formed between the lens plate 12 and the ferrule main body 11 and this gap serves as a matching material filled portion to be filled with an adhesive having a function as a refractive index matching material. In one or more embodiments, the abutment surface arrangement portion 35 is formed to extend from the upper surface to the lower surface of the lens plate 12. Thus, the abutment surface arrangement portion 35 (the matching material filled portion) forms an opening in each of the upper surface and the lower surface of the ferrule structure 10. However, the gap between the lens plate 12 and the ferrule main body 11 may not be filled with any refractive index matching material.

<Detailed Configuration of Abutment Surface 36>

Figure 3A:
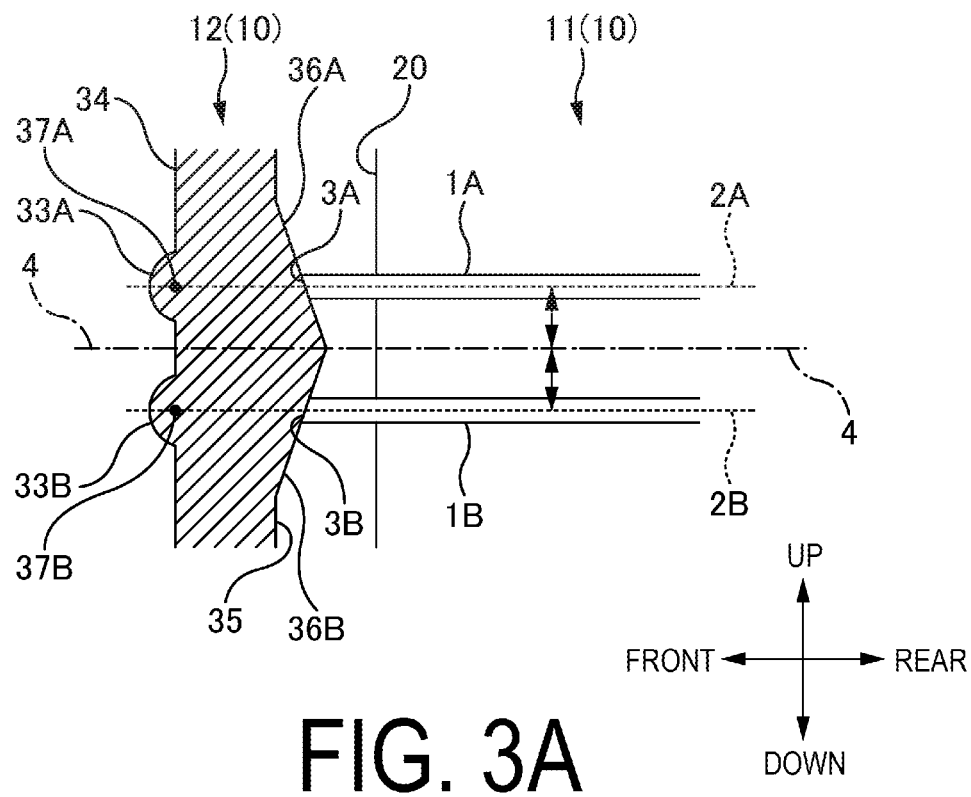
FIG. 3A is an explanatory diagram of a vicinity of abutment surfaces 36.

FIG. 3A is an explanatory diagram of a vicinity of abutment surface 36.

The abutment surface 36 includes the upper abutment surface 36A and the lower abutment surface 36B. The upper abutment surface 36A is an abutment surface against which the end face of the optical fiber 1A inserted toward the upper lens 33A abuts. The lower abutment surface 36B is an abutment surface against which the end face of the optical fiber 1B inserted toward the lower lens 33B abuts. As illustrated in FIG. 3A, the upper abutment surface 36A is inclined with respect to a plane perpendicular to an optical axis 2A of the optical fiber 1A (a plane perpendicular to the front-rear direction). The lower abutment surface 36B is inclined with respect to a plane perpendicular to an optical axis 2B of the optical fiber 1B (a plane perpendicular to the front-rear direction). Furthermore, the inclination angle of the upper abutment surface 36A and the inclination angle of the lower abutment surface 36B are symmetric with respect to a symmetry plane 4 illustrated in FIG. 3A. In other words, the upper abutment surface 36A and the lower abutment surface 36B are formed so as to be symmetric in the up-down direction.

Here, the symmetry plane 4 is a plane with respect to which the optical axis 2A of the optical fiber 1A and the optical axis 2B of the optical fiber 1B are symmetric. As illustrated in FIG. 3A, the symmetry plane 4 is a plane from which the optical axis 2A of the optical fiber 1A and the optical axis 2B of the optical fiber 1B, which is juxtaposed with (in parallel to) the optical fiber 1A, are the same distance apart. However, in practice, there are a plurality of the optical fibers 1A arranged in the left-right direction (the direction perpendicular to the paper plane in FIG. 3A) and a plurality of the optical fibers 1B arranged in the left-right direction, and thus the symmetry plane 4 is a plane from which the optical axis 2A of each of the optical fibers 1A and each of the optical fibers 1B are the same distance apart. As a result, the symmetry plane 4 is a plane with respect to which the optical axis 2A of the optical fiber 1A and the optical axis 2B of the optical fiber 1B are symmetric. The upper abutment surface 36A is inclined forward, as it goes upward, the lower abutment surface 36B is inclined forward, as it goes downward, and the symmetry plane 4 forms a boundary between the upper abutment surface 36A and the lower abutment surface 36B. The angle between the plane perpendicular to the optical axis 2A of the optical fiber 1A (the plane perpendicular to the front-rear direction) and the upper abutment surface 36A is equal to the angle between the plane perpendicular to the optical axis 2B of the optical fiber 1B (the plane perpendicular to the front-rear direction) and the lower abutment surface 36B. As a result, the inclination angle of the upper abutment surface 36A and the inclination angle of the lower abutment surface 36B are symmetric with respect to the symmetry plane 4.

In one or more embodiments, the inclination angle of the upper abutment surface 36A and the inclination angle of the lower abutment surface 36B provided symmetrically with respect to the symmetry plane 4, as illustrated in FIG. 3A, makes it possible to reduce the difference between an optical path length of an optical signal incident or emission from the optical fiber 1A, from the end face 3A of the optical fiber 1A to the lens surface of the upper lens 33A (the surface of the lens 33A) and an optical path length of an optical signal incident or emission from the optical fiber 1B, from the end face 3B of the optical fiber 1B to the lens surface of the lower lens 33B (the surface of the lens 33B). Furthermore, the shape of the abutment surfaces 36 protruding rearward, that is, a shape of the upper abutment surface 36A being inclined forward as it goes upward and of the lower abutment surface 36B being inclined forward as it goes downward, can be easily formed. As a result, it is possible to provide a simple ferrule structure for a lensed connector holding the ends of the two optical fibers 1 (the optical fiber 1A and optical fiber 1B) while reducing a difference between an optical path length, from the end face 3A of the optical fiber 1A to the lens surface of the upper lens 33A, of an optical signal incident or emission from the optical fiber 1A and an optical path length, from the end face 3B of the optical fiber 1B to the lens surface of the lower lens 33B, of an optical signal incident or emission from the optical fiber 1B. However, the abutment surfaces 36 may form a shape recessed forward. In other words, the upper abutment surface 36A may be inclined forward, as it goes downward, and the lower abutment surface 36B may be inclined forward, as it goes upward. In this shape, the inclination angle of the upper abutment surface 36A and the inclination angle of the lower abutment surface 36B are also symmetric with respect to the symmetry plane 4. Thus, it is possible to reduce the difference between an optical path length of an optical signal incident or emission from the optical fiber 1A, from the end face 3A of the optical fiber 1A to the lens surface of the upper lens 33A and an optical path length of an optical signal incident or emission from the optical fiber 1B, from the end face 3B of the optical fiber 1B to the lens surface of the lower lens 33B.

Figure 3B:
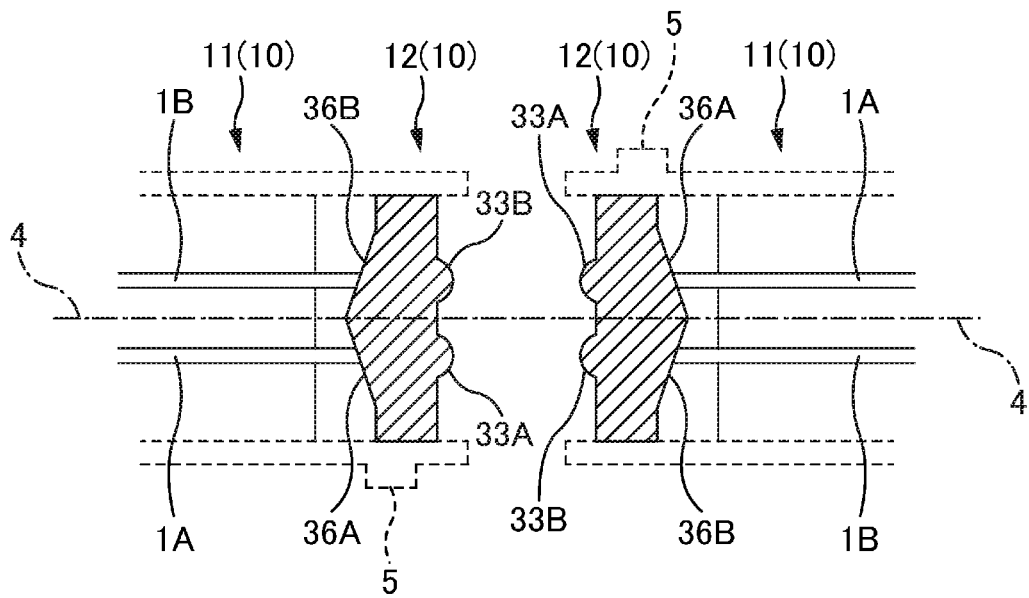
FIG. 3B is an explanatory diagram of connection between optical connectors each having the ferrule structure 10 according to one or more embodiments.

FIG. 3B is an explanatory diagram of connection between optical connectors each having the ferrule structure 10 according to one or more embodiments.

In one or more embodiments, when optical connectors having the ferrule structure 10 are connected to each other, the optical connectors are faced with each other in a state where one of the optical connectors is reversed in the up-down direction with respect to the other of the optical connectors. In other words, in a state where the ferrule structure 10 in one of the optical connectors is reversed in the up-down direction with respect to the ferrule structure 10 in the other of the optical connectors, the ferrule structures 10 are faced with each other. As illustrated in FIG. 3B, the keys 5 which are keys for a rotational direction in the axis of connection direction between each of the optical connectors, are reversed in the up-down direction with respect to left and right optical connectors. As a result, as illustrated in FIG. 3B, in each of the ferrule structures 10, the upper lens 33A in one of the ferrule structures 10 (e.g., the left ferrule structure 10 of FIG. 3B) faces the lower lens 33B of the other of the ferrule structures 10 (e.g., the right ferrule structure 10 of FIG. 3B). Similarly, the lower lens 33B of one of the ferrule structures 10 (e.g., the left ferrule structure 10 of FIG. 3B) faces the upper lens 33A in the other of the ferrule structures 10 (e.g., the right ferrule structure 10 of FIG. 3B). As described above, the inclination angle of the upper abutment surface 36A and the inclination angle of the lower abutment surface 36B are symmetric with respect to the symmetry plane 4. Thus, even when one of the ferrule structures 10 faces the other of the ferrule structures 10 reversed in the up-down direction, as illustrated in FIG. 3B, it is possible to reduce the difference in optical path length between the upper and lower optical fibers 1.

Figure 4:
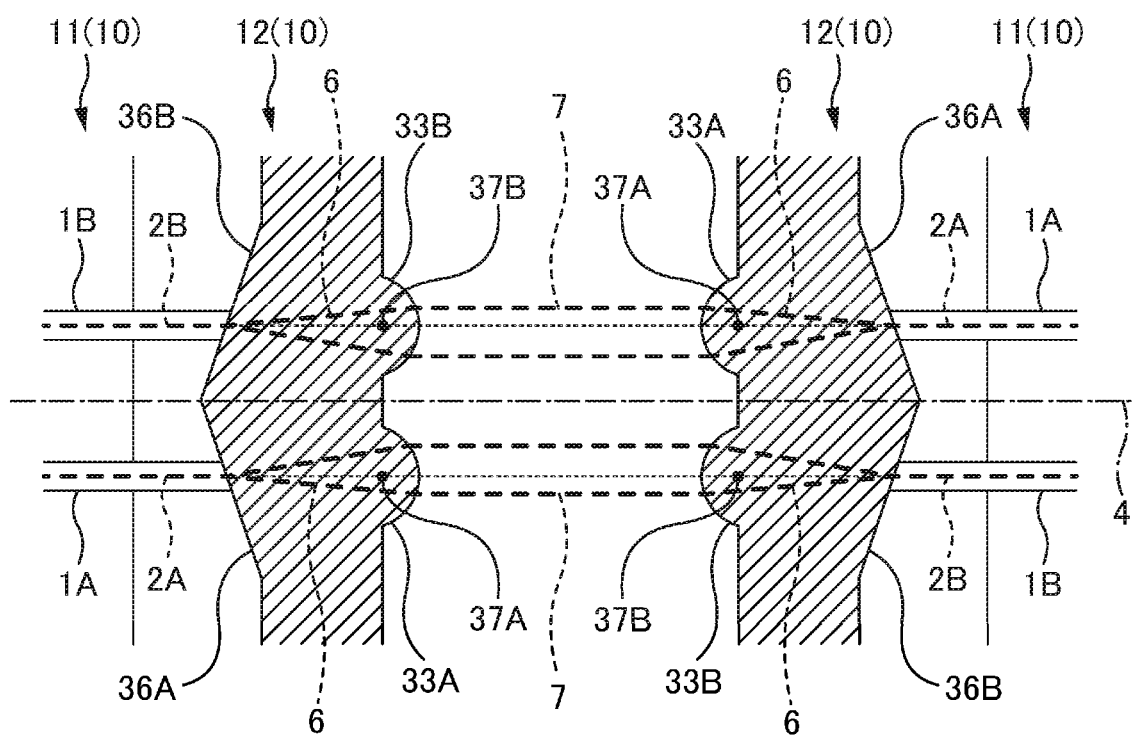
FIG. 4 is an explanatory diagram illustrating how optical signals are transmitted between the ferrule structures 10 facing each other.

FIG. 4 is an explanatory diagram illustrating how optical signals are transmitted between the ferrule structures 10 facing each other.

In one or more embodiments, as illustrated in FIG. 4, the ferrule structures 10 are faced with each other such that the optical axis 2A of the optical fiber 1A held by one of the ferrule structures 10 (e.g., the left ferrule structure 10 in FIG. 4) and the optical axis 2B of the optical fiber 1B held by the other of the ferrule structures 10 (e.g., the right ferrule structure 10 in FIG. 4) are arranged to form a straight line. Similarly, the ferrule structures 10 are faced with each other such that the optical axis 2B of the optical fiber 1B held by one of the ferrule structures 10 (e.g., the left ferrule structure 10 in FIG. 4) and the optical axis 2A of the optical fiber 1A held by the other of the ferrule structures 10 (e.g., the right ferrule structure 10 in FIG. 4) are arranged to form a straight line.

In one or more embodiments, as illustrated in FIG. 4, the distance between the optical axis 2A of the optical fiber 1A and the optical axis 2B of the optical fiber 1B is equal to the distance between a center 37A of the upper lens 33A and a center 37B of the lower lens 33B. In other words, the center 37A of the upper lens 33A is on the optical axis 2A of the optical fiber 1A, and the center 37B of the lower lens 33B is on the optical axis 2B of the optical fiber 1B. In one or more embodiments, although optical signals are refracted at the abutment surface 36, the lens part 33 may not be offset from optical axes 2 of the optical fibers 1 in the formed ferrule structure 10. Thus, it is possible to simplify a ferrule structure for a lensed connector holding the ends of the two optical fibers 1 (the optical fiber 1A and the optical fiber 1B). However, the lens part 33 may be offset from the optical axes 2 of the optical fibers 1 in the formed ferrule structure 10.

A case in which an optical signal is transmitted from the optical fiber 1A held by the right ferrule structure 10 in FIG. 4 to the optical fiber 1B held by the left ferrule structure 10 will be described below. The optical signal transmitted through the optical fiber 1A enters the lens plate 12 from the end face of the optical fiber 1A via the upper abutment surface 36A. As described above, with respect to a plane perpendicular to the optical axis 2A of the optical fiber 1A (a plane perpendicular to the front-rear direction), the upper abutment surface 36A is inclined forward, as it goes upward. Therefore, as illustrated in FIG. 4, after being incident on the upper abutment surface 36A, the optical signal is transmitted as an optical signal refracted downward (lens incident or emission light 6). Note that the angle of the refracted light (lens incident or emission light 6) refracted at the upper abutment surface 36A is determined according to Snell's law. Then, the upper lens 33A collimates the lens incident or emission light 6 to form collimated light 7. In one or more embodiments, the center 37A of the upper lens 33A is on the optical axis 2A of the optical fiber 1A. In other words, the axis of the incident or emission-from-lens light 6 is offset from the center 37A of the upper lens 33A. However, in consideration of the offset, the upper lens 33A (the lens part 33) may be formed to have a larger size. As a result, the optical path of the lens incident or emission light 6 can be incident on the upper lens 33A without protruding outside the lens surface of the upper lens 33A.

Comparative Example

Figure 6A:
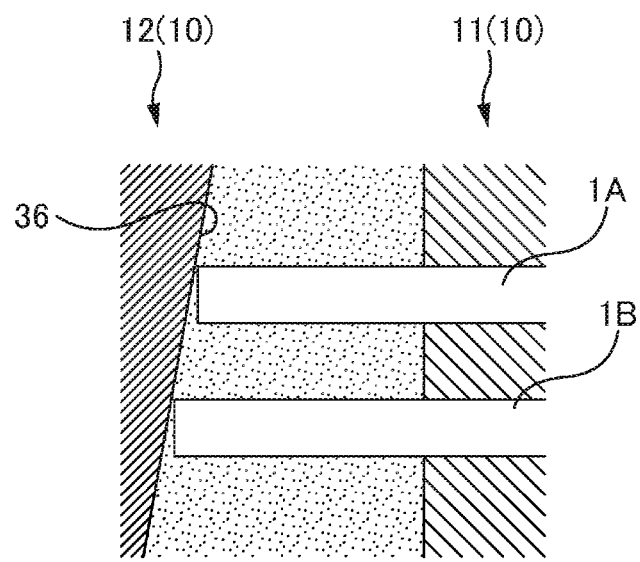
FIG. 6A is an explanatory diagram of a vicinity of an abutment surface 36 of a fiber-attached ferrule structure 10 of a first comparative example.

FIG. 6A is an explanatory diagram of a vicinity of an abutment surface 36 of a fiber-attached ferrule structure 10 of a first comparative example.

In one or more embodiments described above, the abutment surfaces 36 include the upper abutment surface 36A inclined forward, as it goes upward, with respect to a plane perpendicular to the optical axis 2A of the optical fiber 1A, and the lower abutment surface 36B inclined forward, as it goes downward, with respect to a plane perpendicular to the optical axis 2B of the optical fiber 1B. In the first comparative example illustrated in FIG. 6A, the abutment surface 36 is formed as a single surface inclined forward, as it goes downward, with respect to a plane perpendicular to the optical axis 2A of the optical fiber 1A (or the optical axis 2B of the optical fiber 1B).

In the first comparative example, the end faces of the two optical fibers 1 (the optical fiber 1A and optical fiber 1B) are butted against the abutment surface 36 formed as a single inclined surface. Thus, for example, the position in the optical axis direction (the front-rear direction) of the end face of the optical fiber 1A is different from the position in the optical axis direction (the front-rear direction) of the end face of the optical fiber 1B. As a result, the optical path length of the optical signal incident or emission from optical fiber 1A, from the end face of the optical fiber 1A to the lens, is different from the optical path length of the optical signal incident or emission from the optical fiber 1B, from the end face of the optical fiber 1B to the lens.

Figure 6B:
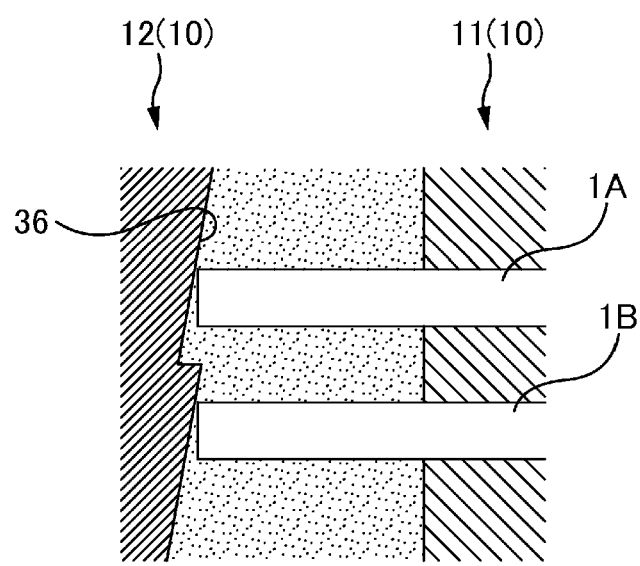
FIG. 6B is an explanatory diagram of a vicinity of an abutment surface 36 of a fiber-attached ferrule structure 10 of a second comparative example.

FIG. 6B is an explanatory diagram of a vicinity of an abutment surface 36 of a fiber-attached ferrule structure 10 of a second comparative example.

In the second comparative example, the inclined abutment surface 36 is formed to have a multistage configuration, in which a step is provided to achieve alignment in the optical axis direction (the front-rear direction) between the end faces of the two optical fibers 1 (the optical fiber 1A and optical fiber 1B) arranged in the up-down direction. This makes it possible to reduce the difference between the optical path length of optical signals incident or emission from the optical fiber 1A, from the end face of the optical fiber 1A to a lens, and the optical path length of optical signals incident or emission from the optical fiber 1B, from the end face of the optical fiber 1B to a lens. However, providing the step complicates the structure of the ferrule structure 10.

Compared to the first comparative example, in one or more embodiments described above, the inclination angle of the upper abutment surface 36A and the inclination angle of the lower abutment surface 36B provided symmetrically with respect to the symmetry plane 4 makes it possible to reduce the difference between an optical path length of an optical signal incident or emission from the optical fiber 1A, from the end face 3A of the optical fiber 1A to the lens surface of the upper lens 33A and an optical path length of an optical signal incident or emission from the optical fiber 1B, from the end face 3B of the optical fiber 1B to the lens surface of the lower lens 33B. Furthermore, the shape of the abutment surfaces 36 protruding rearward, that is, a shape of the upper abutment surface 36A being inclined forward as it goes upward and of the lower abutment surface 36B being inclined forward as it goes downward, can be formed more easily than a shape having a step, as in the fiber-attached ferrule structure 10 of the second comparative example.

<Method of Manufacturing Fiber-Attached Ferrule Structure 10>

Figure 5:
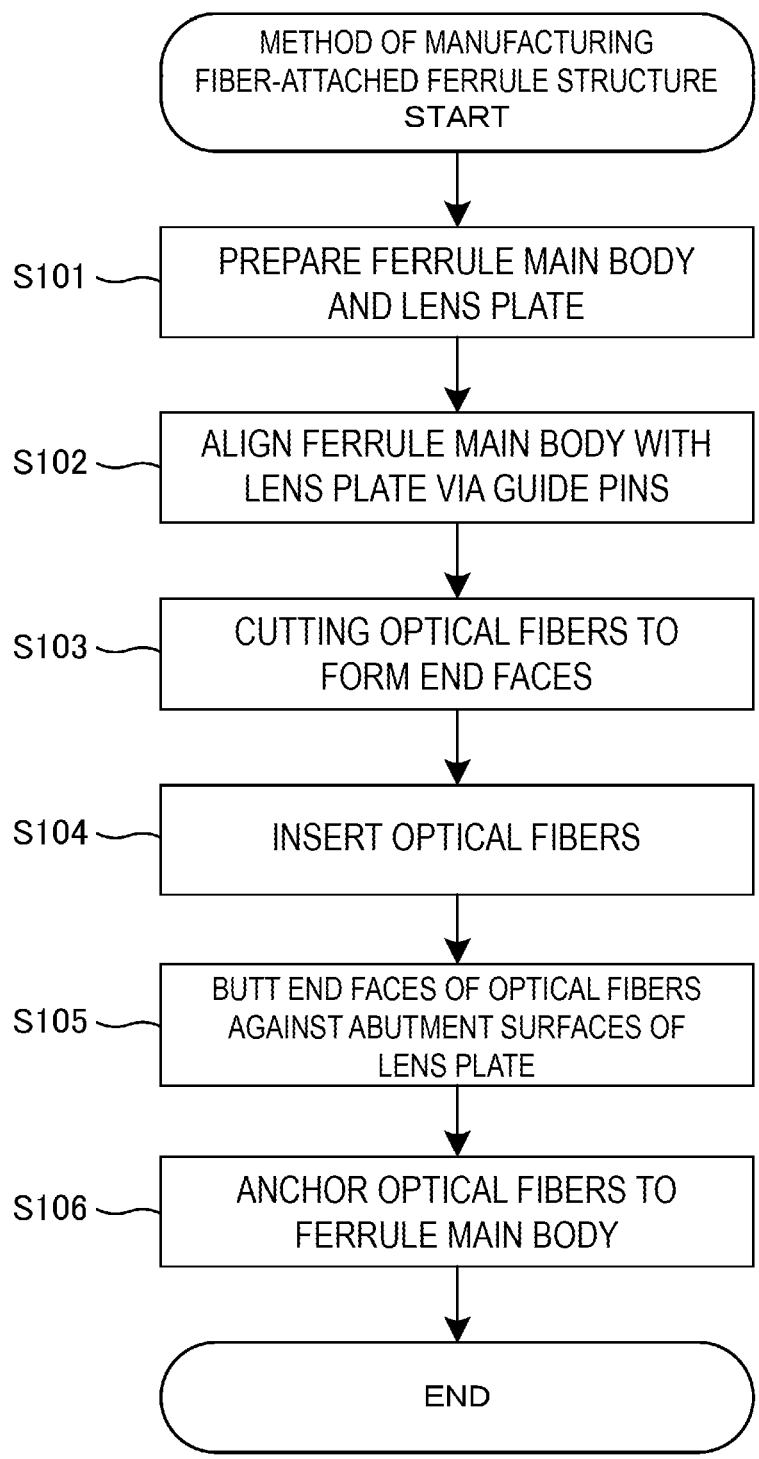
FIG. 5 is a flow diagram of a manufacturing method (assembly procedure) of the fiber-attached ferrule structure 10 according to one or more embodiments.

FIG. 5 is a flow diagram of a manufacturing method (assembly procedure) of the fiber-attached ferrule structure 10 according to one or more embodiments.

First, an operator prepares the ferrule main body 11 and the lens plate 12 (S101). The operator also prepares guide pins (not illustrated) for the next step. The operator further prepares a jig for assembling the ferrule main body 11 and the lens plate 12, as needed.

Then, the operator aligns the ferrule main body 11 and the lens plate 12 via the guide pins (S102). At this time, the operator inserts guide pins (not illustrated) into both of the main body side guide holes 21 of the ferrule main body 11 and the plate side guide holes 32 of the lens plate 12. As a result, the ferrule main body 11 and the lens plate 12 are aligned with each other in the up-down direction and the left-right direction. The operator also causes the front end face 20 of the ferrule main body 11 to come into contact with the rear end face 31 of the lens plate 12, in a state where the guide pins are inserted. As a result, the ferrule main body 11 and the lens plate 12 are positioned with respect to each other in the front-rear direction. Note that, the state of connecting between the front end face 20 of the ferrule main body 11 and the rear end face 31 of the lens plate 12 can be kept, by attaching the ferrule structure 10 which the ferrule main body 11 and the lens plate 12 are attached via the guide pins (not illustrated) to a jig.

Once the ferrule main body 11 and the lens plate 12 are aligned with each other in S102, the positional relationship between the ferrule main body 11 and the lens plate 12 is in a state illustrated in FIGS. 1A and 2B (the guide pins are not illustrated). In this state, as a result of providing the abutment surface arrangement portion 35 in the lens plate 12, a gap is formed between the lens plate 12 and the ferrule main body 11. Additionally, the abutment surface 36 of the lens plate 12 faces the openings of the fiber holes 22 of the ferrule main body 11.

Next, the operator cuts each end faces of the optical fibers 1 of the optical fiber tape (S103). Cutting the end faces of the optical fibers 1 can be performed by using laser cutting, mechanically cutting with a blade, or a polishing process. As described above, the inclination angle of the upper abutment surface 36A and the inclination angle of the lower abutment surface 36B are symmetric with respect to the symmetry plane 4, and thus the inclination angles of the end faces of the optical fibers 1 to be butted against the respective abutment surface 36 are also cut so as to be symmetric with respect to the symmetry plane 4.

The operator then inserts each of the optical fibers 1 of the optical fiber tape into the respective fiber holes 22 of the ferrule main body 11 (S104). Then, the operator causes the optical fibers 1 to protrude from the front end face 20 of the ferrule main body 11 (the opening surface of the fiber holes 22). However, at this stage, the operator does not yet butt the end faces of the optical fibers 1 against the abutment surfaces 36 (the bottom surface of the abutment surface arrangement portion 35) of the lens plate 12. This is because when the optical fibers 1 are passed through the fiber holes 22, dust or the like may adhere to the end faces of the optical fibers 1.

The end faces of the optical fibers 1 may be cleaned (not illustrated) prior to S105 (abutment process) or S106 (optical fiber anchoring process) described below. For example, the operator sprays air to blow off dust adhering to the end faces of the optical fibers 1 protruding from the front end face 20 of the ferrule main body 11. As a result, the dust adhering to the end faces of the optical fibers 1 when the optical fibers 1 are inserted into the fiber holes 22 (S104) can be removed.

Next, the operator further inserts the optical fibers 1 to butt the end faces of the optical fibers 1 against the abutment surfaces 36 of the lens plate 12 (105). As described above, the end faces of the optical fibers 1 are formed so as to be inclined with respect to a plane perpendicular to the front-rear direction (a plane perpendicular to the optical axes of the optical fibers 1). In addition, as described above, the optical fibers 1 are inserted into the fiber holes 22 such that the inclined end faces of the optical fibers 1 come into contact with the abutment surfaces 36. As a result, it is possible to prevent formation of an air layer between the end faces of the optical fibers 1 and the abutment surfaces 36. Note that in one or more embodiments, the worker inserts a boot into the fiber insertion port 23. However, the boot may not be inserted into the fiber insertion port 23.

Next, the operator anchors the optical fibers 1 to the ferrule main body 11 (S106). In the optical fiber anchoring process of S106, first, the operator fills the adhesive filled portion 24 of the ferrule main body 11 with an adhesive. As a result, the adhesive is applied between the inner wall surfaces of the adhesive filled portion 24 and the optical fibers 1. Once the adhesive filled portion 24 is filled with the adhesive, the adhesive spreads into between the inner wall surfaces of the fiber holes 22 and the optical fibers 1. Then, the operator injects an adhesive serving as a refractive index matching material through an opening on the top side of the abutment surface arrangement portion 35. Once the abutment surface arrangement portion 35 is filled with the adhesive serving as a refractive index matching material in S106, the adhesive spreads into the micro gap between the contact surfaces of the ferrule main body 11 and the lens plate 12. Once the adhesive is solidified, the ferrule main body 11 can be adhesively fixed to the lens plate 12. As a result, it is easy to adhesively fix the ferrule main body 11 and the lens plate 12 to each other. Finally, the operator performs a curing process of the adhesive. When an ultraviolet curing resin is used as the adhesive, the operator irradiates the adhesive with ultraviolet light. When an ultraviolet curing resin is used as the adhesive, the worker heats the adhesive.

Additional Description

As illustrated in FIG. 3A, the end face 3A of the optical fiber 1A is formed so as to be inclined with respect to a plane perpendicular to the optical axis 2A of the optical fiber 1A, and is formed so as to be brought into contact with the upper abutment surface 36A. Similarly, the end face 3B of the optical fiber 1B is formed so as to be inclined with respect to a plane perpendicular to the optical axis 2B of the optical fiber 1B, and is formed so as to be brought into contact with the lower abutment surface 36B. Note that the inclined end face 3A of the optical fiber 1A and the inclined end face 3B of the optical fiber 1B are formed using a polishing process. In cutting the end faces of the optical fibers 1 (S103 in the method of manufacturing the fiber-attached ferrule structure 10), laser cutting or mechanical cutting by a blade can be used to form an inclined end face. This makes it possible to decrease a gap between the end face of the optical fiber and the abutment surface. However, the end face 3A of the optical fiber 1A may not be formed so as to be inclined with respect to a plane perpendicular to the optical axis 2A of the optical fiber 1A. For example, the end face 3A of the optical fiber 1A may be perpendicular to the optical axis 2A of the optical fiber 1A. As a result, the end face 3A may not be formed so as to be brought into contact with the upper abutment surface 36A. Similarly, the end face 3B of the optical fiber 1B may not be formed so as to be inclined with respect to a plane perpendicular to the optical axis 2B of the optical fiber 1B. For example, the end face 3B of the optical fiber 1B may be perpendicular to the optical axis 2B of the optical fiber 1B. As a result, the end face 3B may not be formed so as to be brought into contact with the lower abutment surface 36B.

Figure 7:
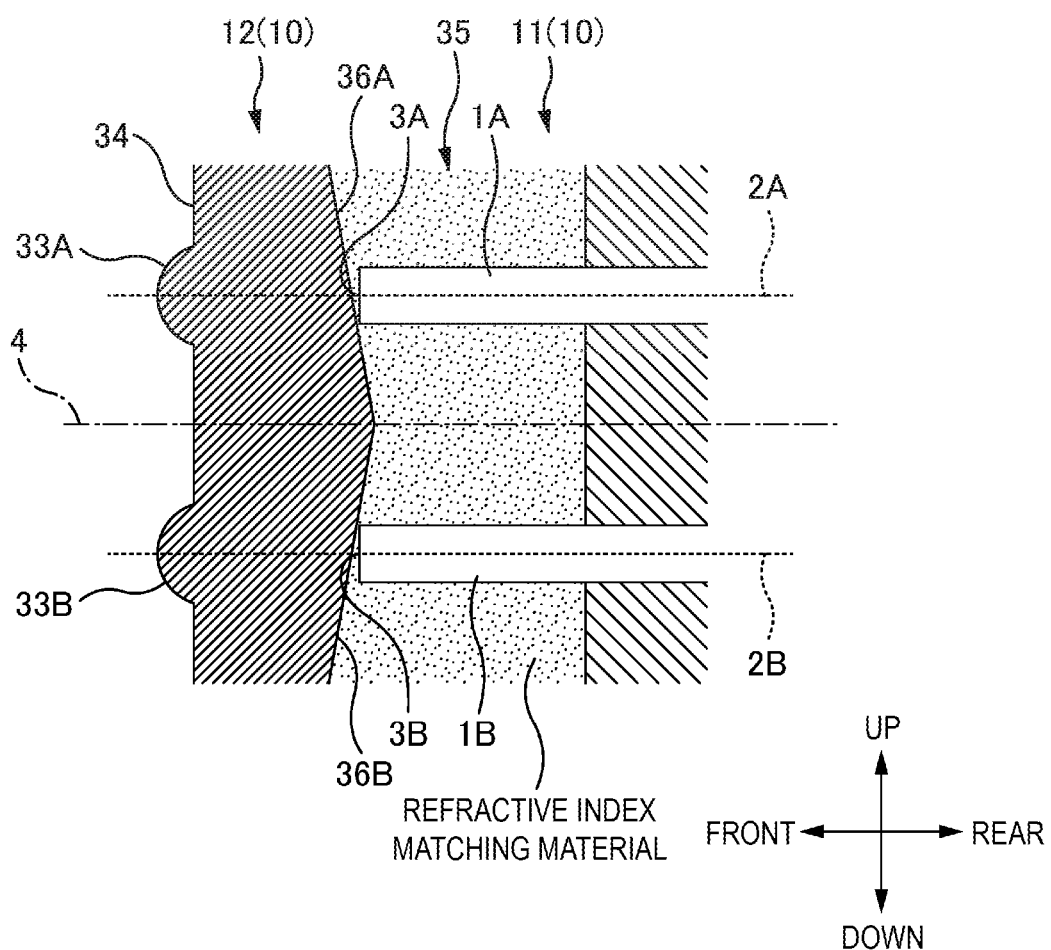
FIG. 7 is an explanatory diagram of another example of the fiber-attached ferrule structure 10.

FIG. 7 is an explanatory diagram of another example of the fiber-attached ferrule structure 10.

In the fiber-attached ferrule structure 10 illustrated in FIG. 7, the end face 3A of the optical fiber 1A is perpendicular to the optical axis 2A. Further, in the fiber-attached ferrule structure 10 illustrated in FIG. 7, the end face 3B is also perpendicular to the optical axis 2B. Note that the abutment surface arrangement portion 35 between the lens plate 12 and the ferrule main body 11 is filled with a refractive index matching material. Note that other configurations are the same as the fiber-attached ferrule structure 10 illustrated in FIG. 3A.

Also in the fiber-attached ferrule structure 10 illustrated in FIG. 7, the inclination angle of the upper abutment surface 36A and the inclination angle of the lower abutment surface 36B provided symmetrically with respect to the symmetry plane 4 makes it possible to reduce the difference between an optical path length of an optical signal incident or emission from the optical fiber 1A, from the end face 3A of the optical fiber 1A to the lens surface of the upper lens 33A and an optical path length of an optical signal incident or emission from the optical fiber 1B, from the end face 3B of the optical fiber 1B to the lens surface of the lower lens 33B. Furthermore, the shape of the abutment surface 36 protruding rearward, that is, a shape of the upper abutment surface 36A being inclined forward as it goes upward and of the lower abutment surface 36B being inclined forward as it goes downward, can be easily formed. As a result, it is possible to provide a simple ferrule structure for a lensed connector holding the ends of the two optical fibers 1 (the optical fiber 1A and optical fiber 1B) while reducing a difference between an optical path length, from the end face 3A of the optical fiber 1A to the lens surface of the upper lens 33A, of an optical signal incident or emission from the optical fiber 1A and an optical path length, from the end face 3B of the optical fiber 1B to the lens surface of the lower lens 33B, of an optical signal incident or emission from the optical fiber 1B.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1A Optical fiber (first optical fiber)
1B Optical fiber (second optical fiber)
2A, 2B Optical axis of optical fiber
3A, 3B End face
4 Symmetry plane
5 Key
6 Lens incident or emission light
7 Collimated light
10 Ferrule structure
11 Ferrule main body
12 Lens plate
20 Front end face
21 Main body side guide hole
22A, 22B Fiber hole
23 Fiber insertion port
24 Adhesive filled portion
30 Front end face
31 Rear end face
32 Plate side guide hole
33A Upper lens (first lens)
33B Lower lens (second lens)
34 Lens provided portion
35 Abutment surface arrangement portion
36A Upper abutment surface (first abutment surface)
36B Lower abutment surface (second abutment surface)
37A, 37B Center

The invention claimed is:

1. A ferrule comprising:
a main body configured to hold an end of a first optical fiber and an end of a second optical fiber parallel to the first optical fiber; and
a lens plate comprising:
a first abutment surface configured to abut against an end face of the first optical fiber;
a second abutment surface configured to abut against an end face of the second optical fiber;
a first lens configured to face the end face of the first optical fiber; and
a second lens configured to face the end face of the second optical fiber, wherein
the first abutment surface is inclined with respect to a plane perpendicular to a first optical axis of the first optical fiber,
the second abutment surface is inclined with respect to a plane perpendicular to a second optical axis of the second optical fiber,
an angle between the first abutment surface and the plane perpendicular to the first optical axis is identical to an angle between the second abutment surface and the plane perpendicular to the second optical axis, and
an inclination orientation of the first abutment surface with respect to the plane perpendicular to the first optical axis is opposite to an inclination orientation of the second abutment surface with respect to the plane perpendicular to the second optical axis.

2. The ferrule according to claim 1, wherein a distance between the first optical axis and the second optical axis is equal to a distance between a center of the first lens and a center of the second lens.

3. A fiber-attached ferrule, comprising:
a first optical fiber;
a second optical fiber parallel to the first optical fiber; and
a ferrule that comprises:
a main body that holds an end of the first optical fiber and an end of the second optical fiber; and
a lens plate that comprises:
a first abutment surface that abuts against a first end face of the first optical fiber;
a second abutment surface that abuts against a second end face of the second optical fiber;
a first lens that faces the first end face; and
a second lens that faces the second end face, wherein
the first abutment surface is inclined with respect to a first plane perpendicular to a first optical axis of the first optical fiber,
the second abutment surface is inclined with respect to a second plane perpendicular to a second optical axis of the second optical fiber,
an angle between the first abutment surface and the plane perpendicular to the first optical axis is identical to an angle between the second abutment surface and the plane perpendicular to the second optical axis, and
an inclination orientation of the first abutment surface with respect to the plane perpendicular to the first optical axis is opposite to an inclination orientation of the second abutment surface with respect to the plane perpendicular to the second optical axis.

4. The fiber-attached ferrule according to claim 3, wherein a distance from the first end face to the first lens is equal to a distance from the second end face to the second lens.

5. The fiber-attached ferrule according to claim 3, wherein the first end face is inclined with respect to a plane perpendicular to the first optical axis and is in contact with the first abutment surface, and
the second end face is inclined with respect to a plane perpendicular to the second optical axis and is in contact with the second abutment surface.

6. A method of manufacturing a fiber-attached ferrule comprising a first optical fiber, a second optical fiber parallel to the first optical fiber, and a ferrule configured to hold an end of the first optical fiber and an end of the second optical fiber, the method comprising:
preparing a ferrule comprising:
a main body configured hold an end of the first optical fiber and an end of the second optical fiber; and
a lens plate that comprises:
a first abutment surface configured to abut against a first end face of the first optical fiber;
a second abutment surface configured to abut against a second end face of the second optical fiber;
a first lens configured to face the first end face; and
a second lens configured to face the second end face, wherein
the first abutment surface is inclined with respect to a plane perpendicular to a first optical axis of the first optical fiber,
the second abutment surface is inclined with respect to a plane perpendicular to a second optical axis of the second optical fiber,
an angle between the first abutment surface and the plane perpendicular to the first optical axis is identical to an angle between the second abutment surface and the plane perpendicular to the second optical axis, and
an inclination orientation of the first abutment surface with respect to the plane perpendicular to the first optical axis is opposite to an inclination orientation of the second abutment surface with respect to the plane perpendicular to the second optical axis;
butting the first end face against the first abutment surface; and
butting the second end face against the second abutment surface.

7. The method according to claim 6, the method further comprising:
cutting the first optical fiber and forming the first end face inclined with respect to a plane perpendicular to the first optical axis; and
cutting the second optical fiber and forming the second end face inclined with respect to a plane perpendicular to the second optical axis.

8. A ferrule comprising:
a main body configured to hold an end of a first optical fiber and an end of a second optical fiber parallel to the first optical fiber; and
a lens plate comprising:
a first abutment surface configured to abut against a first end face of the first optical fiber;
a second abutment surface configured to abut against a second end face of the second optical fiber;
a first lens configured to face the first end face; and
a second lens configured to face the second end face, wherein
the first abutment surface is inclined with respect to a plane perpendicular to an optical axis of the first optical fiber,
the second abutment surface is inclined with respect to a plane perpendicular to an optical axis of the second optical fiber,
an angle between the first abutment surface and the plane perpendicular to the first optical axis is identical to an angle between the second abutment surface and the plane perpendicular to the second optical axis, and
an inclination orientation of the first abutment surface with respect to the plane perpendicular to the first optical axis is opposite to an inclination orientation of the second abutment surface with respect to the plane perpendicular to the second optical axis.

9. A fiber-attached ferrule, comprising:
a first optical fiber;
a second optical fiber parallel to the first optical fiber; and
a ferrule that comprises:
a main body that holds an end of the first optical fiber and an end of the second optical fiber; and
a lens plate that comprises:
a first abutment surface that abuts against a first end face of the first optical fiber;
a second abutment surface that abuts against a second end face of the second optical fiber;
a first lens that faces the first end face; and
a second lens that faces the second end face, wherein
the first abutment surface is inclined with respect to a plane perpendicular to an optical axis of the first optical fiber,
the second abutment surface is inclined with respect to a plane perpendicular to an optical axis of the second optical fiber,
an angle between the first abutment surface and the plane perpendicular to the first optical axis is identical to an angle between the second abutment surface and the plane perpendicular to the second optical axis, and
an inclination orientation of the first abutment surface with respect to the plane perpendicular to the first optical axis is opposite to an inclination orientation of the second abutment surface with respect to the plane perpendicular to the second optical axis.

10. A method of manufacturing a fiber-attached ferrule comprising a first optical fiber, a second optical fiber parallel to the first optical fiber, and a ferrule configured to hold an end of the first optical fiber and an end of the second optical fiber, the method comprising:
preparing a ferrule comprising:
a main body configured hold an end of the first optical fiber and an end of the second optical fiber; and
a lens plate that comprises:
a first abutment surface configured to abut against a first end face of the first optical fiber;
a second abutment surface configured to abut against a second end face of the second optical fiber;
a first lens configured to face the first end face; and
a second lens configured to face the second end face, wherein
the first abutment surface is inclined with respect to a plane perpendicular to an optical axis of the first optical fiber, the second abutment surface is inclined with respect to a plane perpendicular to an optical axis of the second optical fiber,
an angle between the first abutment surface and the plane perpendicular to the first optical axis is identical to an angle between the second abutment surface and the plane perpendicular to the second optical axis, and
an inclination orientation of the first abutment surface with respect to the plane perpendicular to the first optical axis is opposite to an inclination orientation of the second abutment surface with respect to the plane perpendicular to the second optical axis;

butting the first end face against the first abutment surface; and butting the second end face against the second abutment surface.

* * * * *